(12) United States Patent
Vaner

(10) Patent No.: US 11,882,049 B2
(45) Date of Patent: Jan. 23, 2024

(54) MANAGING NETWORK LATENCY USING BUFFER FILL CONTROL

(71) Applicant: Avast Software s.r.o., Prague (CZ)

(72) Inventor: Michal Vaner, Prague (CZ)

(73) Assignee: Avast Software s.r.o., Prague (CZ)

( * ) Notice: Subject to any disclaimer, the term of this patent is extended or adjusted under 35 U.S.C. 154(b) by 203 days.

(21) Appl. No.: 17/370,814

(22) Filed: Jul. 8, 2021

(65) Prior Publication Data

US 2023/0012394 A1   Jan. 12, 2023

(51) Int. Cl.
*H04L 47/30* (2022.01)
*H04L 43/0852* (2022.01)
*H04L 41/0896* (2022.01)

(52) U.S. Cl.
CPC .......... *H04L 47/30* (2013.01); *H04L 41/0896* (2013.01); *H04L 43/0852* (2013.01)

(58) Field of Classification Search
CPC . H04L 47/30; H04L 41/0896; H04L 43/0852; H04L 41/0816; H04L 43/0858; H04L 43/0876
See application file for complete search history.

(56) References Cited

U.S. PATENT DOCUMENTS

| | | | |
|---|---|---|---|
| 2015/0117201 A1* | 4/2015 | Cousins | H04L 43/0852 370/235 |
| 2018/0176818 A1* | 6/2018 | Parron | H04W 28/0278 |
| 2022/0417164 A1* | 12/2022 | Fruchter | H04L 65/80 |

OTHER PUBLICATIONS

Ebrahimi (Bufferbloat, 2019, https://www.cs.toronto.edu/~yganjali/resources/Course-Handouts/CSC458/H17----PA2----Bufferbloat.pdf, retrieved on Mar. 24, 2023). (Year: 2019).*
Brown, Martin. Introduction to Linux Traffic Control. Oct. 2006. Accessed at: https://tldp.org/HOWTO/Traffic-Control-HOWTO/.
The Linux Kernel Archives. Linux Kernel Organization, Inc. Accessed at: https://www.kernel.org/.
Cake—Common Applications Kept Enhanced. Bufferbloat.net Accessed at: https://www.bufferbloat.net/projects/codel/wiki/Cake/.

* cited by examiner

*Primary Examiner* — Abdulkader M Alriyashi
(74) *Attorney, Agent, or Firm* — AVEK IP, LLC; Mark C. Young; William B. Kircher

(57) ABSTRACT

A method of managing a fill state of a buffer in an external device includes monitoring the latency of a network connection to an external device having a network buffer via a managing device. A state of fill of the network buffer is determined based on at least the monitored latency of the network connection, and the effective network speed is estimated based on the state of fill of the network buffer. One or more network traffic scheduling parameters are adjusted in response to the estimated effective network speed, such as a maximum currently usable network speed that is lower than a maximum possible speed of the network. The maximum currently usable network speed of the network connection is periodically increased if the monitored latency is in a normal state and the maximum currently usable network speed is lower than the maximum possible speed of the network.

20 Claims, 3 Drawing Sheets

MANAGING NETWORK LATENCY USING BUFFER FILL CONTROL

FIELD

The invention relates generally to buffers in computer network systems, and more specifically to control network buffer fill, or "buffer bloat" in an external or remote networked device.

BACKGROUND

Computers are valuable tools in large part for their ability to communicate with other computer systems and to retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, the type and variety of network devices and services offered continues to rapidly grow. All network devices, including home routers and modems, include buffers to queue or hold data waiting to be transferred. This generally improves performance of the network, as the buffers can help to compensate for varying network traffic loads and permit devices to continue to perform other functions while buffered data waits to be transferred.

Large buffers help utilize the network capacity better, but can create problems as well. As a network becomes congested, a sender sending network packets through a device with a large buffer will not see the buffer fill up, and can significantly overestimate the speed with which the network is able to accept data until the buffer is full and new packets are not accepted. Once a buffer is full, it is unlikely to be able to handle network traffic well due to the filled buffer combined with the high level of network traffic that caused the buffer to fill, causing long wait times for packets in the buffer or waiting to be sent. This increase in waiting times and response latency is a serious problem for latency-critical services, such as streaming media or videoconferencing.

A need therefore exists for better management of network devices with large buffers to compensate for buffers filling up with network data.

SUMMARY

One example embodiment of the invention comprises a method of managing a fill state of a buffer in an external device. The latency of a network connection to an external device having a network buffer is monitored via a managing device, and a state of fill of the network buffer is determined based on at least the monitored latency of the network connection. The effective network speed is estimated based on externally observed behavior of the remote device's network buffer, and one or more network traffic scheduling parameters are adjusted in response to the estimated effective network speed.

In a further example, the one or more traffic scheduling parameters comprise a maximum currently usable network speed that is lower than a maximum possible speed of the network, or which is reduced from the maximum possible speed of the network.

In another example, the maximum currently usable network speed of the network connection is periodically increased if the monitored latency is in a normal state and the maximum currently usable network speed is lower than the maximum possible speed of the network.

The details of one or more examples of the invention are set forth in the accompanying drawings and the description below. Other features and advantages will be apparent from the description and drawings, and from the claims.

DETAILED DESCRIPTION

Figure 1:
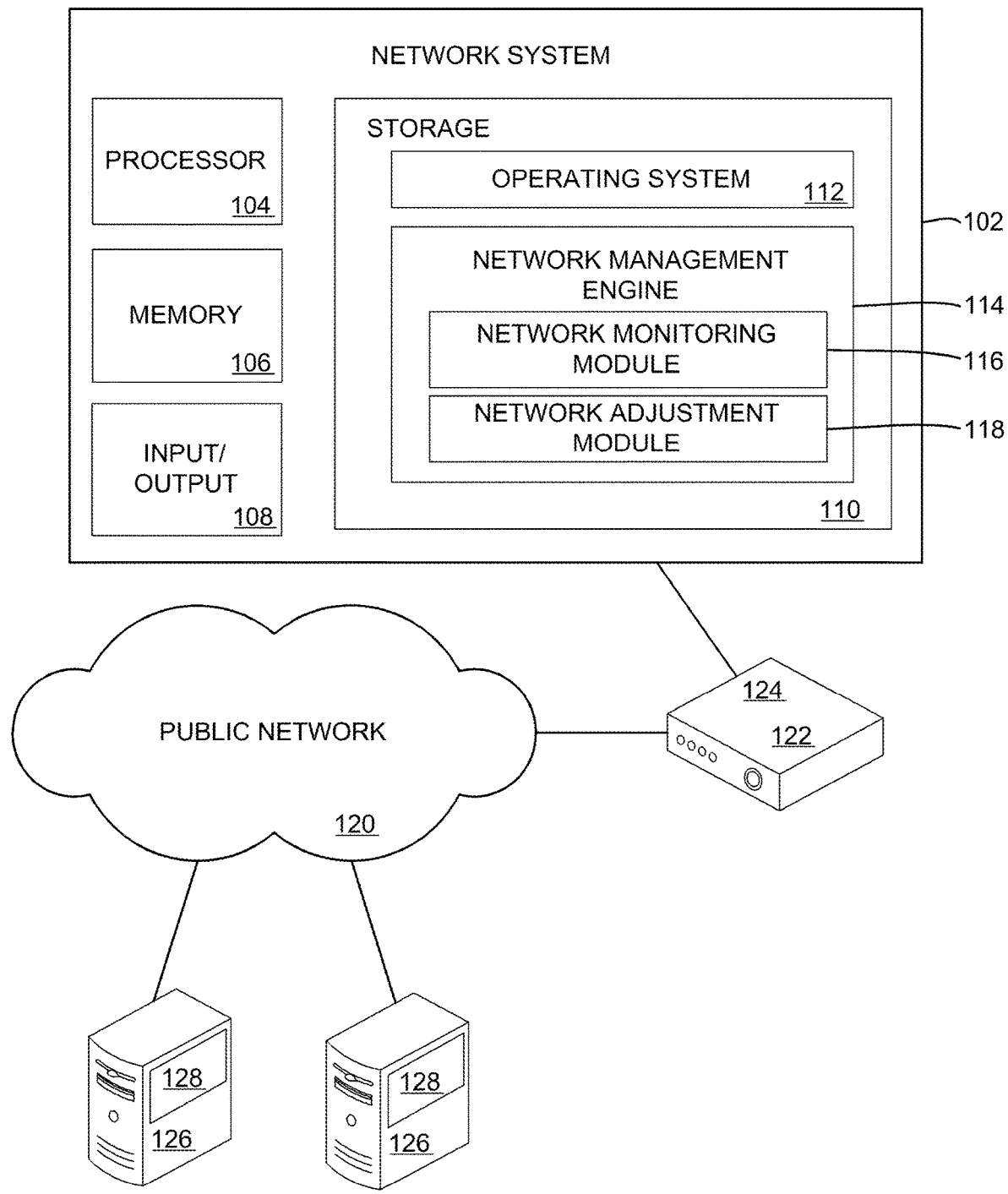
FIG. 1 shows a network environment with a networks system operable to reduce network latency by managing the buffer fill state of an external network system, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As computer networks handle more data and more types of data, managing data flow through a network becomes increasingly complex. Many network devices have input buffers that enable the device to store received data for processing or output buffers that store outbound data while other data can be processed, freeing the network device to process data while the network is busy. Increasingly large buffers can compensate for increasingly busy networks or higher variations in network traffic. But if the buffer becomes too large compared to the network speed, the time packets wait in the buffer grows beyond usable limits as latency-sensitive applications stutter and lag, becoming impractical to use.

The problem is exacerbated when large files or other streaming data are being transferred, as the sender initially sees only that the sent packets continue to be received and handled. Once the buffer becomes full, no additional packets can be received or handled, no matter what the priority of the packets, until the buffer once again has space to receive new network traffic. Further, newly-arriving packets cannot be handled and so are simply discarded. The sender discovers through network protocols that the packet was lost in transit across the network, and re-sends the packet, often slowing down the packet transmission rate due to the observed packet loss. This allows the sender to regulate the transmission rate accordingly to match the speed of the network.

As technology continues to improve, network speeds grow, and packet transmission speed increases, buffer sizes have increased to handle the increase in traffic. Buffer size is often selected to handle a certain time's worth of network traffic (such as milliseconds), such that modern devices operating at gigabit or faster network speeds may have huge buffers relative to devices designed to work with Digital Subscriber Line (DSL) or other older technologies. If a modern device with large network buffers is coupled to a slow link such as a DSL link, the relatively large buffer in the modern device can now hold too many packets for the network speed and can retain network traffic for an unacceptably long time before being released. But, because the packets are received and retained in the buffer rather than discarded, the sender does not slow down as it would if packets were lost, which leads to the buffer gradually filling. The buffer designed to hold milliseconds of data now holds seconds worth of data, causing latency that is noticeable in applications such as videoconferencing, movie streaming, and the like. This buffer condition is known as bufferbloat.

This issue has previously been addressed by methods such as setting an artificially reduced maximum speed for network communication, thereby reducing the chances of the large buffer filling beyond acceptable limits, or by the device with the buffer providing feedback as to its remaining buffer capacity to other network devices. But, neither solution is usable in environments where the large buffer is out of the user's control and doesn't support any such compensating measures.

Some examples described herein therefore provide for reducing latency in a network having a remote or external device prone to bufferbloat by monitoring certain network characteristics and adjusting the network traffic sent to the device with a buffer that is full or nearly full to compensate for the "bufferbloat" condition. In a more detailed example, a local network device monitors the latency of a network connection through a remote or external device with a network buffer to other network devices. Latency, or the delay in packet travel through the network device with the buffer is monitored in particular, and increased latency suggests that the effective network speed is reduced. An observed reduced effective network speed, estimated based on the observed latency, is used to select a maximum currently usable network speed that is lower than the maximum possible network speed and that is used to artificially limit the speed of network traffic to the network device with the buffer.

When the maximum currently usable network speed is set lower than the maximum possible network speed and latency returns to a normal rate, the maximum currently usable network speed is incrementally increased at intervals of time such that the maximum currently usable network speed eventually returns to the maximum possible network speed. This restores regular full-speed network operation over time if network latency remains in a normal state.

The buffer therefore doesn't become full to unacceptable levels, causing unacceptable latency for applications such as videoconferencing or media streaming, but instead is managed externally by limiting the amount of network traffic fed to the device with a large network buffer. This avoids a bufferbloat condition and the unacceptable latency that comes with a large buffer becoming unacceptably full, even while not having direct access to the buffer state, by using latency observations and network speed adjustments to manage the amount of network traffic held in the buffer.

FIG. 1 shows a network environment with a networks system operable to reduce network latency by managing the buffer fill state of an external network system, consistent with an example embodiment. Here, a network system 102 comprises a processor 104, memory 106, input/output elements 108, and storage 110. Storage 110 includes an operating system 112, and a network management engine 114 that is operable to monitor and manage the buffer state of another external or remote network device using network monitoring module 116 and network adjustment module 118. The network system 102 in this example is connected to a public network 120 (such as the Internet) via a network system 122 having a large network buffer 124, which in turn couples remote network servers such as 126 having UDP packet latency measurement response modules 128.

In operation, the network system 102's network management engine monitors traffic through network computer 122 with the large buffer 124. This is done in a more detailed example by monitoring latency of packets sent from network system 102 to one or more systems on public network 120 via the network computer 122, using network monitoring module 116. In a further example, network monitoring module 116 monitors latency of a specific UDP packet sent to one or more remote servers 126, which include a timestamp for the packet sent from network monitoring module 116 as well as the reply packet sent by remote computer 126's UDP packet latency measurement response modules 128. Although there may be some time offset between network system 102 and remote networked servers 126, the difference in offset will be evident as the networked computer 122's large buffer 124 becomes unacceptably full and latency between the network system 102 and the public network 120 increases. In the example shown in FIG. 1, multiple remote servers 126 are employed so that network congestion local to any one remote server 126 is not a factor in evaluating latency of the network connection between network system 102 and the public network 120.

If latency increases due to reasons other than the buffer 124 of networked computer 122 becoming unacceptably full, additional metrics such as the state of network buffers local to networked system 102 can be observed, such that if the buffers local to networked system 102 are becoming full it can be concluded that the networked computer 122 is not the bottleneck and the maximum currently usable network speed of networked computer 122 is not decreasing.

When latency is detected by network monitoring module 116 to be at a level higher than a normal or baseline latency time range, the network management module 118 estimates the effective speed of the network given the observed latency. This effective network speed is used to set a new maximum currently usable network speed, which limits the speed with which network system 102 sends data to network computer 122 with buffer 124 in an unacceptably bloated or unacceptably full state. By reducing the maximum currently usable network speed to a speed the buffer is able to manage, the buffer does not continue to fill up, but instead is able to handle network traffic as it is received.

As the network continues to operate with a reduced maximum currently usable network speed, the network monitoring module 116 continues to monitor for increases in latency which would indicate that the maximum currently usable network speed needs to be further reduced. If the latency continues to be at the normal or baseline level, the network adjustment module 118 will after a period of time adjust the maximum currently usable network speed incrementally higher, toward the maximum possible network speed, anticipating that the unacceptably full buffer or buffer bloat condition may be subsiding and a reduction in network speed is no longer necessary to protect the buffer from continuing to fill up with network data.

In estimating the current network speed, the network monitoring module 116 in some examples has a lower bound of the estimate based on recently observed throughput metrics—i.e., if the network has recently passed a substantial amount of data through networked computer 122 at a certain rate, that rate is likely a reasonable lower bound for the estimated maximum currently usable network speed. Knowledge regarding previous guesses based on measured network latency, current state of maximum currently usable network speed, and other network characteristics can similarly be used to determine or estimate an upper bound, and a maximum currently usable network speed can be selected. If the chosen maximum currently usable network speed is too low, it will eventually be increased over time as the latency returns to normal, and if the maximum currently usable network speed is too high, it will be reduced as latency above the normal or baseline level continues to be observed.

Measurement of latency in some examples comprises sending a specially-formatted UDP packet or equivalent from network monitoring module 116 to a remote server such as 126, through the networked computer 122 with the buffer 124 that is being managed. In the example of FIG. 1, multiple remote computers 126 are available, such that any increase in observed latency is due to fill of buffer 124 rather than a slow connection to one of the remote servers 126. Upon receiving the UDP packet, remote computer 126's UDP packet latency measurement response modules 128 receive the UDP packet and respond, and in a further example append a time stamp or other information to the UDP packet before replying to network system 102. When the network system 102 receives the reply UDP packet, it process the time taken for the round trip, the time stamp embedded in the UDP packet by the remote computer 126, and other such information to determine whether the network is operating with normal latency or is suffering from buffer bloat or an unacceptably full network buffer 124. Although the system time of remote systems 126 may differ from the clock time of network system 102, changes in latency in the outbound or return trips can be separately identified by using a timestamp in remote systems 126, even with such a time offset between systems.

In a further example, the network monitoring module attempts to separately determine whether buffers 124 are full independently for traffic destined for public network 120 and traffic received from public network 120, such as by observing latency of outbound and incoming traffic separately. Latency due to outgoing traffic can be managed by reducing the effective network speed of traffic from network system 102 to networked system 122 with the full buffer, but reducing this speed artificially will exacerbate rather than help congestion due to a high rate of traffic coming from public network 120. Tools such as a UDP packet round-trip with a time stamp inserted by remote computer 126's UDP packet latency measurement response modules 128 can help determine whether latency is a result of incoming or outgoing traffic, further ensuring that network system 102 manages the network speed appropriately to best manage the buffer fill state of networked computer 122. In another example, networked computer 122 has separate incoming and outgoing buffers, and they are managed independently using methods such as those described herein.

In some examples, the network monitoring module 116 further monitors the state of network buffers local to networked system 102. If the local system buffers become congested, it is likely that observed latency may be a result of the local buffers being full or nearly full, and so lowering the network speed between computer 102 and attached networked computers such as 122 would not be of benefit and is not performed.

The local network system 102 can in some examples employ traffic prioritization to further manage network flow and reduce latency. If the remote networked device with the large buffer supports traffic prioritization, prioritizing high priority packets at the sender can help those packets advance through the device with the congested buffer more quickly by bypassing the congested buffer or exiting the congested buffer first. If the remote networked device doesn't support traffic prioritization, sending high priority packets from the local device 102 will not help, as these packets will simply be added to the congested buffer if buffer space is available.

By monitoring network latency and making adjustments to the maximum currently usable network speed in response, the local network system 102 can manage the fill state of the buffer 124 of an attached networked computer 122 without having any direct access to or knowledge of the fill state of the buffer 124. This prevents the buffer 124 from becoming unacceptably full, and from causing unacceptable latency for applications such as videoconferencing or media streaming.

Figure 2:
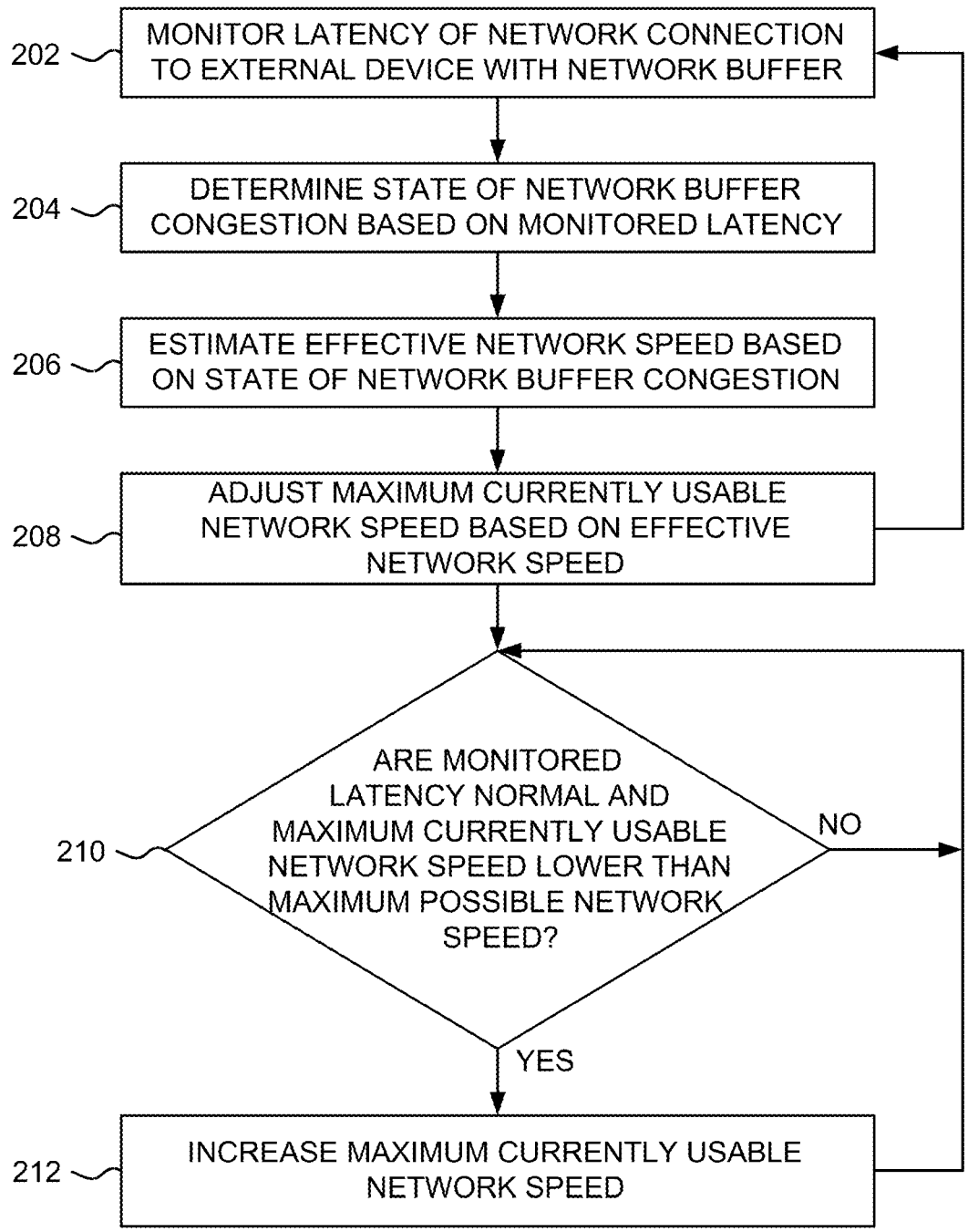
FIG. 2 is a flowchart of a method of reducing network latency by managing the state of a network buffer in an external networked device, consistent with an example embodiment.

FIG. 2 is a flowchart of a method of reducing network latency by managing the state of a network buffer in an external networked device, consistent with an example embodiment. At 202, the managing device monitors the latency of a network connection of an external device with a network buffer, such as by sending UDP network packets through the external device to a remote network server and measuring the latency of the UDP outgoing and return packets. The state of network buffer fill in the external device is determined at 204, based at least in part on the latency observed at 202. Other factors, such as local buffer fill state and normal latency characteristics are used in a further example to determine the state of network buffer fill. The network buffer fill or congestion state can be estimated based on observed latency because latency of network traffic through the network device with the large buffer increases roughly proportionately to the amount of data stored in its buffer. If the observed latency is unacceptably long, it can therefore be reasonably inferred that the buffer is unacceptably full.

The effective network speed of the external device is estimated at 206, based on the state of network congestion. This effective network speed estimate is used to adjust a maximum currently usable network speed parameter at 208, which the local or managing computer then uses to manage or control the rate at which network data is sent to the external device with the buffer that is becoming full. This process repeats as shown by the return arrow to 202, such that if the latency continues to be abnormally high the maximum currently usable network speed is further reduced.

At 210, the managing device determines whether the monitored latency has returned to normal if the maximum currently usable network speed has been reduced to a rate lower than the maximum possible network speed. If the maximum currently usable network speed is at a reduced level but network latency appears to have returned to a normal state, the maximum currently usable networked speed is increased at 212. In a further example, this increase occurs occasionally if these conditions are met, such as every second, every 10 seconds, every 30 seconds, every minute, or the like. If these conditions are not met at 210 but the maximum currently usable network speed is in a reduced state, this process continues to monitor for a return to normal latency at 210 until such a condition is observed and the process proceeds to 212.

This process enables the managing system to both identify a large buffer that is becoming unacceptably full by observing changes in network latency and decrease the maximum currently usable network speed to manage the buffer fill state at 202-208, and to identify a return to normal conditions and undo the decreases in maximum currently usable network speed at 210-212 when the buffer in the external device returns to normal. The managing device can therefore regulate the maximum currently usable network speed up and down to effectively control the fill state of the network buffer in an external device without any special interface or cooperation from the external device (such as signaling an actual measured buffer state), ensuring smooth operation of the network.

Figure 3:
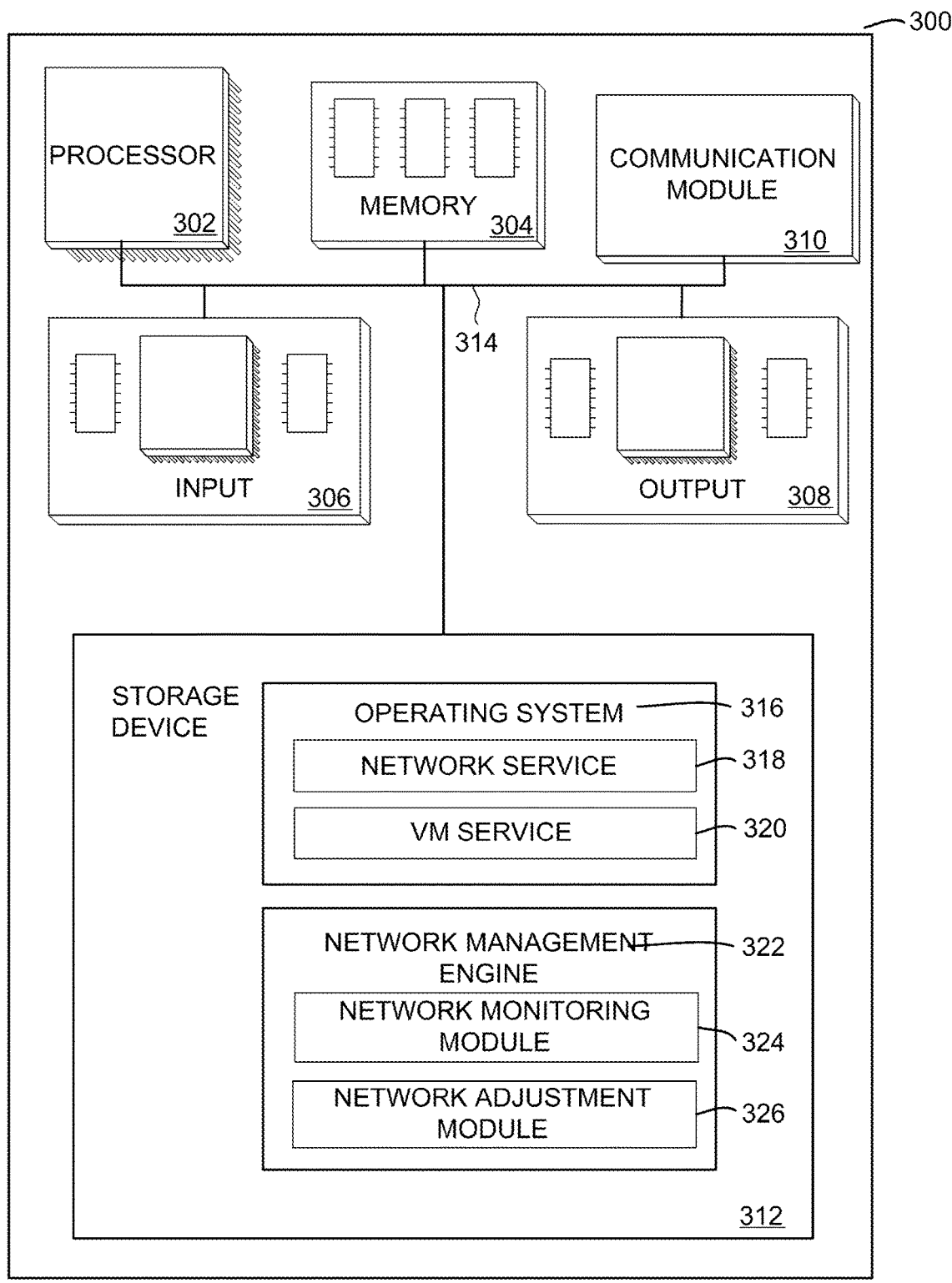
FIG. 3 is a networked computer system comprising a network management engine, consistent with an example embodiment.

FIG. 3 is a networked computer system comprising a network management engine, consistent with an example embodiment of the invention. FIG. 3 illustrates only one particular example of computing device 300, and other computing devices 300 may be used in other embodiments. Although computing device 300 is shown as a standalone computing device, computing device 300 may be any component or system that includes one or more processors or another suitable computing environment for executing software instructions in other examples, and need not include all of the elements shown here.

As shown in the specific example of FIG. 3, computing device 300 includes one or more processors 302, memory 304, one or more input devices 306, one or more output devices 308, one or more communication modules 310, and one or more storage devices 312. Computing device 300, in one example, further includes an operating system 316 executable by computing device 300. The operating system includes in various examples services such as a network service 318 and a virtual machine service 320 such as a virtual server. One or more applications, such as network management engine 322 are also stored on storage device 312, and are executable by computing device 300.

Each of components 302, 504, 306, 308, 310, and 312 may be interconnected (physically, communicatively, and/or operatively) for inter-component communications, such as via one or more communications channels 314. In some examples, communication channels 314 include a system bus, network connection, inter-processor communication network, or any other channel for communicating data. Applications such as network management engine 322 and operating system 316 may also communicate information with one another as well as with other components in computing device 300.

Processors 302, in one example, are configured to implement functionality and/or process instructions for execution within computing device 300. For example, processors 302 may be capable of processing instructions stored in storage device 312 or memory 304. Examples of processors 302 include any one or more of a microprocessor, a controller, a digital signal processor (DSP), an application specific integrated circuit (ASIC), a field-programmable gate array (FPGA), a graphics processing unit (GPU), or similar discrete or integrated logic circuitry.

One or more storage devices 312 may be configured to store information within computing device 300 during operation. Storage device 312, in some examples, is known as a computer-readable storage medium. In some examples, storage device 312 comprises temporary memory, meaning that a primary purpose of storage device 312 is not long-term storage. Storage device 312 in some examples is a volatile memory, meaning that storage device 312 does not maintain stored contents when computing device 300 is turned off. In other examples, data is loaded from storage device 312 into memory 304 during operation. Examples of volatile memories include random access memories (RAM), dynamic random access memories (DRAM), static random access memories (SRAM), and other forms of volatile memories known in the art. In some examples, storage device 312 is used to store program instructions for execution by processors 302. Storage device 312 and memory 304, in various examples, are used by software or applications running on computing device 300 such as network management engine 322 to temporarily store information during program execution.

Storage device 312, in some examples, includes one or more computer-readable storage media that may be configured to store larger amounts of information than volatile memory. Storage device 312 may further be configured for long-term storage of information. In some examples, storage devices 312 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 300, in some examples, also includes one or more communication modules 310. Computing device 300 in one example uses communication module 310 to communicate with external devices via one or more networks, such as one or more wireless networks. Communication module 310 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 300 uses communication module 310 to communicate with an external device such as via public network 120 of FIG. 1.

Computing device 300 also includes in one example one or more input devices 306. Input device 306, in some examples, is configured to receive input from a user through tactile, audio, or video input. Examples of input device 306 include a touchscreen display, a mouse, a keyboard, a voice responsive system, video camera, microphone or any other type of device for detecting input from a user.

One or more output devices 308 may also be included in computing device 300. Output device 308, in some examples, is configured to provide output to a user using tactile, audio, or video stimuli. Output device 308, in one example, includes a display, a sound card, a video graphics adapter card, or any other type of device for converting a signal into an appropriate form understandable to humans or machines. Additional examples of output device 308 include a speaker, a light-emitting diode (LED) display, a liquid crystal display (LCD), or any other type of device that can generate output to a user.

Computing device 300 may include operating system 316. Operating system 316, in some examples, controls the operation of components of computing device 300, and provides an interface from various applications such as network management engine 322 to components of computing device 300. For example, operating system 316, in one example, facilitates the communication of various applications such as network assessment engine 322 with processors 302, communication unit 310, storage device 312, input device 306, and output device 308. Virtual machine (VM) service 320 enables a system such as a server to execute multiple instances of an operating system and/or other services, providing a segregated operating or execution environment for different applications or users. Applications such as network management engine 322 may include program instructions and/or data that are executable by computing device 300. As one example, network management engine 322 includes a network monitoring module 324 and a network adjustment module 326 operable to monitor latency of a connection in an external computerized system and adjust the usable network speed if latency is high to compensate for a buffer bloat or full condition. These and other program instructions or modules may include instructions that cause computing device 300 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of improving network latency by managing a fill state of a buffer in an external device, comprising:
   monitoring via a managing device a latency of a network connection to an external device having a network buffer;
   determining a state of fill of the network buffer based on at least the monitored latency of the network connection,
   estimating effective network speed of the external device based on the state of fill of the network buffer, and
   adjusting one or more network traffic scheduling parameters in response to the estimated effective network speed.

2. The method of improving network latency by managing a fill state of a buffer in an external device of claim 1, wherein the one or more traffic scheduling parameters comprise a maximum currently usable network speed that is lower than a maximum possible speed of the network.

3. The method of improving network latency by managing a fill state of a buffer in an external device of claim 2, further operable to periodically increase the maximum currently usable network speed of the network connection if the monitored latency is in a normal state and the maximum currently usable network speed is lower than the maximum possible speed of the network.

4. The method of improving network latency by managing a fill state of a buffer in an external device of claim 2, wherein the maximum currently usable network speed is approximately a current throughput capacity of the network buffer.

5. The method of improving network latency by managing a fill state of a buffer in an external device of claim 2, wherein the network traffic scheduling parameters further comprise packet priority.

6. The method of improving network latency by managing a fill state of a buffer in an external device of claim 1, wherein monitoring via a managing device the latency of a network connection to an external device having a network buffer comprises monitoring latency from the managing device to one or more remote servers through the external device's network buffer.

7. The method of improving network latency by managing a fill state of a buffer in an external device of claim 6, wherein monitoring latency from the managing device to one or more remote servers through the external device's network buffer comprises monitoring a round-trip UDP packet response from the managing device to the one or more remote servers and back to the managing device.

8. The method of improving network latency by managing a fill state of a buffer in an external device of claim 1, wherein the state of monitored latency comprises at least one of degree of latency and change in latency.

9. The method of improving network latency by managing a fill state of a buffer in an external device of claim 1, wherein determining a state of fill of the network buffer further comprises monitoring at least one of packet loss ratio, latency jitter, and fill of one or more network buffers local to the managing device.

10. The method of improving network latency by managing a fill state of a buffer in an external device of claim 1, further comprising monitoring upload and download network buffers independently.

11. A computerized networked remote buffer latency managing device, comprising:
    a processor operable to execute computer instructions, and a set of executable computer instructions configured when executed to:
    monitor via the managing device a latency of a network connection to an external device having a network buffer;
    determine a state of fill of the network buffer based on at least the monitored latency of the network connection,
    estimate effective network speed of the external device based on the state of fill of the network buffer, and
    adjust one or more network traffic scheduling parameters in response to the estimated effective network speed.

12. The computerized networked remote buffer latency managing device of claim 11, wherein the one or more traffic scheduling parameters comprise a maximum currently usable network speed that is lower than a maximum possible speed of the network.

13. The computerized networked remote buffer latency managing device of claim 12, the set of executable computer instructions further configured when executed to periodically increase the maximum currently usable network speed of the network connection if the monitored latency is in a normal state and the maximum currently usable network speed is lower than the maximum possible speed of the network.

14. The computerized networked remote buffer latency managing device of claim 12, wherein the maximum currently usable network speed is approximately a current throughput capacity of the network buffer.

15. The computerized networked remote buffer latency managing device of claim 12, wherein the network traffic scheduling parameters further comprise packet priority.

16. The computerized networked remote buffer latency managing device of claim 11, wherein monitoring via a managing device the latency of a network connection to an external device having a network buffer comprises monitoring latency from the managing device to one or more remote servers through the external device's network buffer.

17. The computerized networked remote buffer latency managing device of claim 16, wherein monitoring latency from the managing device to one or more remote servers through the external device's network buffer comprises monitoring a round-trip UDP packet response from the managing device to the one or more remote servers and back to the managing device.

18. The computerized networked remote buffer latency managing device of claim 11, wherein the state of monitored latency comprises at least one of degree of latency and change in latency.

19. The computerized networked remote buffer latency managing device of claim 11, wherein determining a state of fill of the network buffer further comprises monitoring at least one of packet loss ratio, latency jitter, and fill of one or more network buffers local to the managing device.

20. The computerized networked remote buffer latency managing device of claim 11, the set of executable computer instructions further configured when executed to monitor upload and download network buffers independently.

* * * * *